Figure 1:
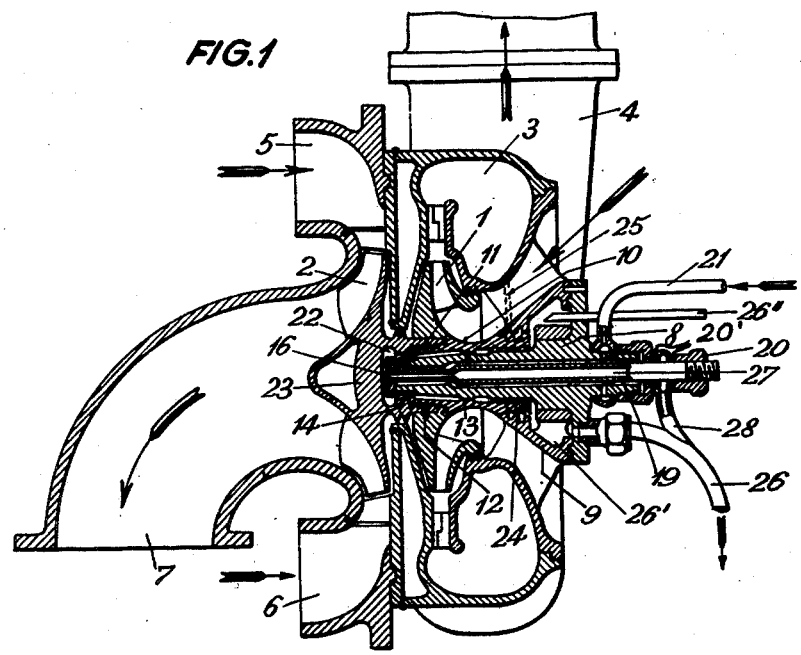

Aug. 23, 1949.   A. BÜCHI   2,480,095
SHAFT AND BEARING ARRANGEMENT
Filed Jan. 21, 1947   2 Sheets-Sheet 1

INVENTOR:
Alfred Büchi
by Sommers & Young
Attorneys

Aug. 23, 1949.  A. BÜCHI  2,480,095
SHAFT AND BEARING ARRANGEMENT
Filed Jan. 21, 1947  2 Sheets-Sheet 2
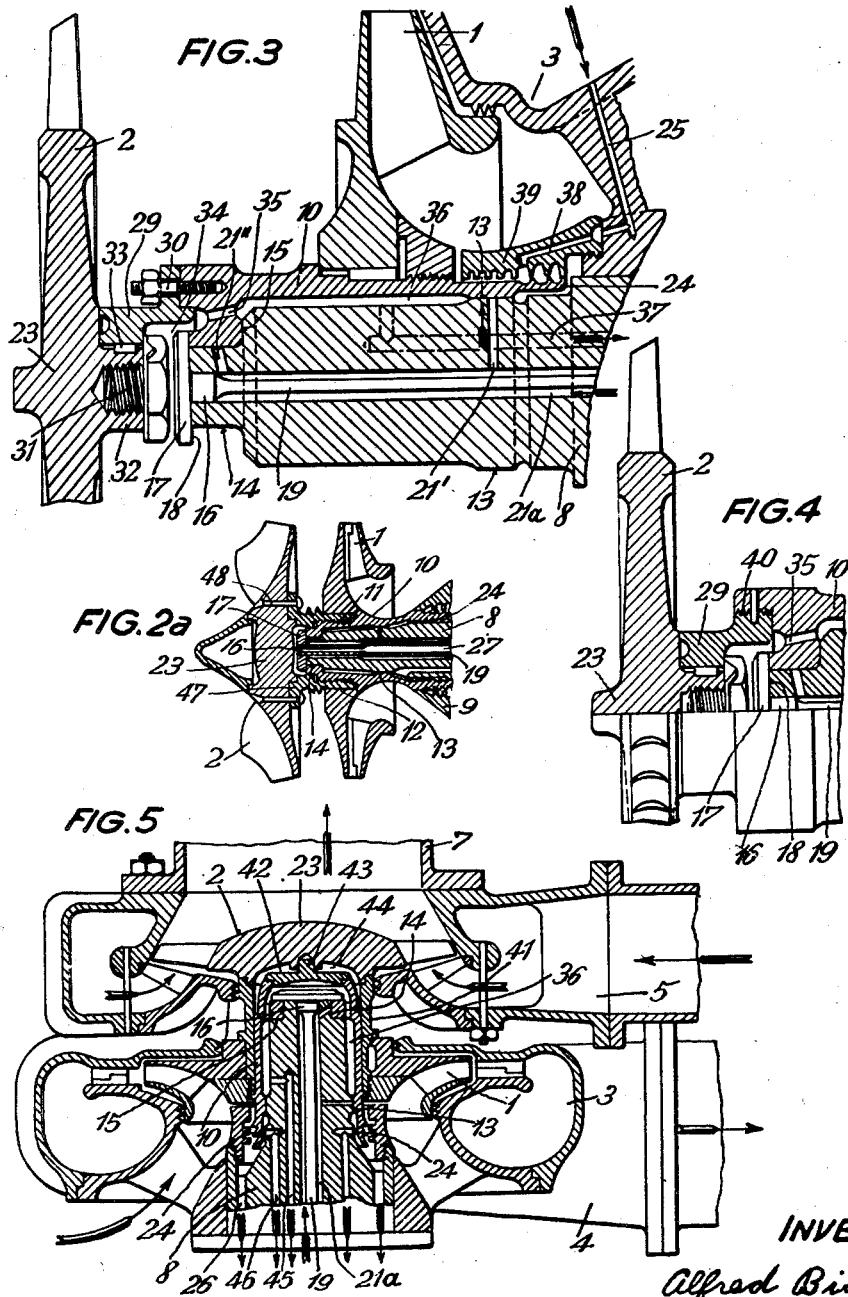
INVENTOR:
Alfred Büchi
by Sommers + Young
Attorneys Patented Aug. 23, 1949

2,480,095

UNITED STATES PATENT OFFICE 2,480,095

SHAFT AND BEARING ARRANGEMENT

Alfred Büchi, Winterthur, Switzerland

Application January 21, 1947, Serial No. 723,415
In Switzerland January 21, 1946

13 Claims. (Cl. 230—116)

My present invention relates to improvements in rotary bearing arrangements of the plain radial-and-thrust type and the lubrication thereof, in general, and in particular to bearings of such type in gas-turbine driven blowers in which the interconnected blower-impeller and turbine-rotor rotate as structural unit about a fixed hollow pivot projecting into the blower casing from the cold blower-side.

The main object of my present invention is to adapt the innermost neck-journal-bearing, disposed adjacent to the turbine or turbine rotor, also as thrust-bearing which locates the unitary rotor-and-shaft structure in both axial directions. To this end, the stationary pivot is provided with a shoulder which resists the axial thrust in direction of the blower and a special structural element, comprising a headed solid or hollow spindle, is adapted to be introduced, from the turbine side, into the said pivot and to be secured thereto so as to resist the axial thrust in direction of the turbine. In order to permit of introducing and withdrawing the said structural element into or from the blower-impeller and/or the turbine-rotor mounted on the said pivot, a disengageable connection (which may be of any appropriate type) is provided in the said rotor-and-shaft structure.

Another object of my invention is to adapt the said special structural element (which forms part of the combined radial-and-thrust bearing and which comprises a solid or a hollow spindle), without or together with the said pivot, for use with the supply of lubricating oil to either or both bearings and journals. The said special element also may be adapted to supply and drain lubricating oil to and from the bearing or cooling fluidum to and from the hot turbine-rotor disc. Finally, the said special part may be adapted to supply and/or drain lubricating oil and cooling fluidum to the bearing and turbine-rotor disc respectively. Again, the adaptation may be such as to supply and/or drain the lubricating oil or cooling fluidum respectively, entirely or partly through bores in the said stationary pivot.

A further object of the shaft-and-bearing arrangement according to my present invention, is to axially locate the said special structural part introduced into the stationary pivot, and to secure it against rotation, once it has been adjusted for proper axial play. Such adjusting may be effected by radially interposing shims between the thrust face proper of the said special structural element and the end face of the said pivot.

Another object is to prevent the journal-and-bearing lubricating oil from contacting the hot turbine-rotor, and to center the free end of the stationary pivot structure on the turbine rotor.

A still further object is to provide an oil-thrower at the blower end of the rotary bearing portion, i. e. at the blower end in the composite rotor-and-impeller stub shaft.

A still further object is to provide facilities for diminishing the quantity of oil to be flung off the oil-thrower to the outer journal.

A still further object is to speed up the flow of oil, and to prevent the latter from entering into the blower inlet.

A still further object is to make provision for locating the inner neck-journal and thrust-bearing at the free end of the stationary pivot as close as possible to/or respectively, in the centre of gravity of the entire rotary system, so as to reduce, as far as possible, the load on the outer journal which, since it is of necessity of larger diameter than the inner journal and thrust bearing, rotates at a higher speed.

Figure 2:
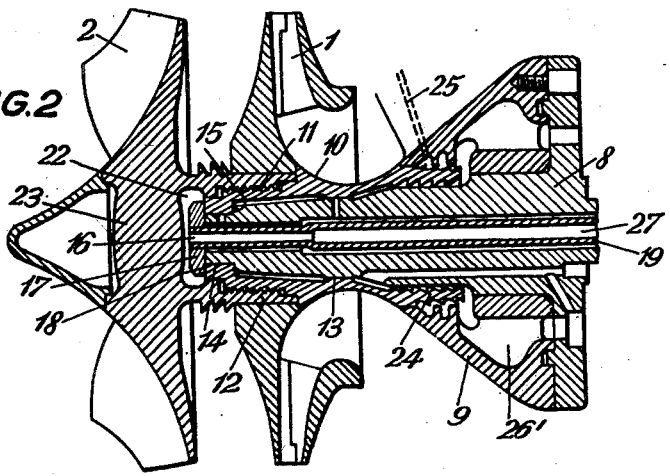

Various modifications of my present invention are illustrated, by way of example, in the accompanying drawings, in which:

Fig. 1 shows an axial section of a first example, i. e. a single-stage horizontally disposed centrifugal blower driven by a gas-turbine, Fig. 2 the essential parts of my invention in such first example, in larger scale, also in axial section, Fig. 2a a modification of the first example, Figs. 3 and 4 are partial axial sections of a second example, Fig. 4 being a slight modification of Fig. 3, and Fig. 5 shows a third example, in axial section, of a vertically disposed gas-turbine driven centrifugal blower.

In Fig. 1, I designates the blower impeller and 2 the gas-turbine rotor. The pressure medium is forced by impeller I into the collector 3 and thence through the header-connection 4. In the gas-turbine, the gases enter through the ports 5, 6 and are discharged at 7. The compound rotor structure 1—2 is journaled on the stationary pivot 8 which is located in the blower casing 9. The rotary sleeve 10 is screwed home into the socket 12 integral with the turbine-rotor hub, on the threads 11. Instead of making socket 12 integral with the turbine-rotor disc, it also may be formed by a separate member 47 (Fig. 2a) which is secured to the hub portion or nave 23 by rivets 48. The rotary sleeve 10 is journaled at 13, 14 on the stationary pivot 8. Journal 14 according to my present invention is adapted as combined neck-journal and thrust-bearing to receive axial thrust acting in either direction.

The arrangement of thrust-bearing 14 may be clearly seen from Fig. 2. Axial thrust in the direction of blower impeller 1 is resisted by the shoulder 15 of pivot 8 and axial thrust in the direction of turbine rotor 2 by a thrust bearing 16 comprising the face 18 of a head 17 integral with or fastly secured to a spindle 19. The latter floats in pivot 8, and is axially located by a nut 20 disposed outside the blower. The thrust-bearing journal is secured to the stationary pivot 8.

Lubricating oil is supplied from the outside through the pipe 21 and flows through the annular space between spindle 19 and stationary pivot 8 to the two bearings 13 and 14, and then into the space 22 back of the hub or nave 23 of turbine wheel 2. The oil flows from space 22 back through bearings 14 and 13 into an oil-thrower 24 provided on the blower-side end of rotary sleeve 10. Oil-thrower 24 may be of any suitable type. To prevent lubricating oil from being ejected into the blower-entrance portion, locking air may be supplied, e. g. from collector 3, through a pipe 25 at an appropriate point into the oil-thrower 24. The oil thrown off flows through the pipe 26 to the outside. The run-off chamber 26' may be provided with a vent 26''. As shown in Fig. 1, also the cooling oil used for cooling the turbine rotor 2 may be discharged through the bore 27 provided in the demountable thrust-bearing portion 16, i. e. in the spindle 19 thereof, and through the pipe 28.

In Fig. 3, blower impeller 1 is directly keyed onto the rotary sleeve 10. A special cylindrical shouldered member 29 is provided for, which is secured on rotary sleeve 10 by screws 30. Member 29 is secured to turbine rotor 2 by a screw 31 engaged in the hub 23 of rotor 2. A key 33 fixes member 29 onto the hub-boss 32. Stationary pivot 8 is provided with a shoulder 15 for receiving the axial thrust of runner aggregate 1—2 in the direction of impeller 1. Thrust-bearing portion 16 is so disposed inside the pivot 8, through the intermediary of spindle 19, as to adapt bearing 14 as neck-journal and thrust-bearing. The thrust toward the turbine is received through the thrust-bearing head 17 or the face 18 thereof respectively.

Lubricating oil flows through the annular space 21a and the cross-bores 21', 21'' to the bearings 13, 14, thence through the space 34, the bores 35, the annular space 36 and back through bearing 13 to the oil-thrower 24. A vent 37 is provided for ventilating space 36. The locking air for oil-thrower 24 is tapped from collector 3, through the bores 25 and 38, and is blown on to the stationary part 39 of oil-thrower 24.

The rotary sleeve 10, however, also could be directly coupled with turbine rotor 2, by means of a detachable connection.

Fig. 4 illustrates a type of connection between rotary-sleeve 10 and turbine rotor 2, similar to that of Fig. 3, with the difference, however, that member 29 is screwed into sleeve 10 on threads 40, instead of by screws 30 as in Fig. 3.

In Fig. 5, the turbine rotor 2, the axis of which is disposed vertical, is welded to a sleeve 41, and impeller 1 is keyed on to the latter. Rotary sleeve 10 is introduced as an individual member into sleeve 41. Again, 16 is the demountable thrust-bearing member, with its spindle 19, and 13, 14 are the neck-journals. Journal 14 again is adapted as thrust bearing, pivot 8 to such end being provided with a shoulder 15, and, on the other hand, the demountable thrust-bearing structure 16 being provided for. Rotary sleeve 10 is provided with a cap 42 which is mounted after thrust-bearing element 16—19, has been introduced. The said cap 42 is provided with a boss or lug 43 which is centered in the hub or nave 23 of turbine rotor 2.

The lubricating oil in this example flows through annular chamber 21a to the bearings 13, 14, from which, however, it cannot flow any longer to rotor 2, since space 44 is closed off therefrom. All the oil therefore, thus must flow downward through space 36. Part thereof may flow off through a bore 45 of pivot 8, and the remainder flows to bearing 13 and thence into oil-thrower 24. The oil is drained through bore 26 provided in stationary pivot 8. Part of the oil, however, also may be caught yet by further drain bores 46 prior to its flow into the oil-thrower 24, and be discharged to the outside.

Bearing 14 preferably is disposed at or near the centre of gravity of the entire rotating aggregate comprising impeller 1, rotor 2, their interconnecting sleeves, and oil-thrower, so as to relieve, as far as possible, bearing 13 which rotates at higher speed.

The rotary sleeve 10, comprising all the journals and rotating about the stationary pivot 8, may be made entirely of bearing metal. Again, the stationary pivot 8 may be made entirely of bearing metal.

What I claim and desire to secure by Letters Patent is:

1. In a direct-connected turbo-blower, in which a gas-driven turbine including a rotor having blades mounted on a rotor nave is employed to drive at least one blower-impeller by direct axial connection, said blower impeller being housed by a casing separating the blower-impeller from the turbine, a shaft-and-bearing arrangement comprising a hollow tapered stationary pivot, one end of which is secured to that side of the blower casing farthest from the turbine and the other end of which is free and projects in the axis of the blower-impeller toward the turbine rotor, said pivot having a neck adjacent its free end, and a shoulder bounding the inner end of the neck, a rotor-and-shaft unit constructed of the turbine rotor and the blower-impeller having interlocking hub means by which they may be connected and disconnected, a sleeve adapted to be inserted and fixed in said unit for rotation on the pivot, a first journal bearing in said sleeve, said first journal bearing being located inwardly, remote from the free end of the pivot, a second journal bearing in said sleeve located about the neck of said pivot, said second bearing having inner and outer thrust bearing faces, the inner of which faces abuts said shoulder and the outer of which faces lies in the radial plane of the free end of the pivot, a spindle adapted for insertion into and to be secured within the hollow area of said pivot, and a headed thrust bearing secured on said spindle, said headed thrust bearing having its inner head face abutting the outer face of the second journal bearing and the free end of the pivot, whereby said second journal bearing acts as a two-way axial thrust bearing for said rotor-and-shaft unit, and the entire combination permits of removal of said spindle and the said headed thrust bearing upon disconnection of the rotor-and-shaft unit.

2. A device as defined in claim 1 in which the spindle has a threaded portion at the end inserted in the pivot and is demountably located therein by means of a nut engaging said threaded portion and abutting the blower casing.

3. A device as described in claim 1 in which the second journal bearing is disposed substantially in the center of gravity of the said rotor-and-shaft unit.

4. A device as described in claim 1 in which the hub means are integral with the turbine-rotor and blower-impeller respectively and are provided with cooperating threaded portions for interlocking purposes.

5. In a shaft-and-bearing arrangement as described in claim 1, a rotor-and-shaft unit also as described in said claim, in which the hub means comprise a hub portion integral with the blower-impeller, and a hub socket fastly secured to the turbine-rotor nave, the said hub portion and hub-socket being provided with the threads each for interlocking purposes.

6. In a shaft-and-bearing arrangement as described in claim 1, a rotor-and-shaft unit also as described in said claim, in which the hub means comprise a flanged ring keyed to the nave of the turbine rotor and locked thereto by headed screw means, a sleeve portion onto which the blower impeller is keyed and fixedly engaged, and a plurality of screws adapted to secure said ring structure to the turbine end of said sleeve.

7. A device as described in claim 1, in which the hub means comprise a flanged ring structure keyed to the nave of the turbine rotor and locked thereto by a headed screw, a sleeve portion onto which the blower-impeller is keyed and fixedly engaged, and a cooperating screw means on the turbine end of the sleeve and on the ring structure adapted to secure the latter to the said sleeve.

8. A device as described in claim 1, in which the hub means comprise an outer sleeve to the ends of which the blow-impeller and the turbine rotor respectively are secured, an inner sleeve slidably fitting in the outer sleeve and secured therein against relative rotation, and a cap for and secured to the turbine end of the inner sleeve, said cap being centered by means of a studlike projection extending into the turbine rotor nave.

9. A device as described in claim 1 having, in addition to the rotary sleeve, means outside the blower casing for admitting lubricating oil and passages in and about the free end of the pivot to allow circulation of said oil in and about said pivot and between said pivot and the rotary sleeve, and oil thrust means disposed on the blower entrance side of said sleeve and adapted to seal the lubricated areas against outward oil leakage and inward blower air infiltration.

10. A device described in claim 1, having duct means leading from the blower collector space of the blower-impeller to the area between the stationary pivot and the rotary sleeve to supply air under pressure to said area for the purpose of preventing an outflow of oil and an inflow of air.

11. A device as described in claim 1, in which the stationary pivot contains bores adapted to carry lubricating oil into the hollow portion of said pivot toward the turbine rotor and outwardly to the surfaces of all said journal bearings.

12. A device as described in claim 1, in which the stationary pivot contains bores adapted to admit cooling fluidum into the center of said pivot and in which the spindle is of such size relative to the pivot as to permit said fluidum to pass out of the free end of the pivot into the turbine rotor nave, and said spindle is hollowed to permit said fluidum thereafter to flow from said nave for removal from the arrangement.

13. A device as described in claim 1, in which the pivot is bored at points outwardly of the rotary sleeve whereby lubricating oil is admitted to the hollow area of the pivot surrounding the spindle, and said pivot is further bored in the vicinity of the journals to carry said oil thereto and therefrom and to ventilate the spaces surrounding the surfaces of the said bearings, and in which said spindle and headed thrust bearing are of a diameter and configuration relative to said pivot to provide an annular duct for the passage about said spindle and within said pivot of cooling fluidum to the nave of the turbine rotor.

ALFRED BÜCHI.

REFERENCES CITED

The following references are of record in the file of this patent:

UNITED STATES PATENTS

| Number | Name | Date |
|---|---|---|
| 2,184,197 | Schutte | Dec. 19, 1939 |